United States Patent
Hardacker et al.

(10) Patent No.: US 8,022,933 B2
(45) Date of Patent: Sep. 20, 2011

(54) ONE BUTTON REMOTE CONTROL WITH HAPTIC FEEDBACK

(75) Inventors: Robert Hardacker, Escondido, CA (US); James Amendolagine, San Marcos, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 798 days.

(21) Appl. No.: 12/034,758

(22) Filed: Feb. 21, 2008

(65) Prior Publication Data

US 2009/0213066 A1 Aug. 27, 2009

(51) Int. Cl.
*G09G 5/00* (2006.01)
*G06F 3/01* (2006.01)

(52) U.S. Cl. ............... 345/169; 715/702; 348/14.05

(58) Field of Classification Search ............... 345/156, 345/169, 173
See application file for complete search history.

(56) References Cited

U.S. PATENT DOCUMENTS

| | | | |
|---|---|---|---|
| 5,508,719 A | 4/1996 | Gervais | |
| 5,815,139 A | 9/1998 | Yoshikawa et al. | |
| 6,822,635 B2 | 11/2004 | Shahoian et al. | |
| 7,151,527 B2 | 12/2006 | Culver | |
| 7,382,357 B2 * | 6/2008 | Panotopoulos et al. | 345/168 |
| 7,450,110 B2 * | 11/2008 | Shahoian et al. | 345/173 |
| 7,460,050 B2 * | 12/2008 | Alvarado et al. | 341/176 |
| 2006/0143342 A1 * | 6/2006 | Kim et al. | 710/73 |

OTHER PUBLICATIONS

From the Economist, "How touching, Computer: 'Haptic' technology is gradually bringing the neglected sense of touch into the digital realm," http://globaltechforurn.eiu.com/index.asp?layout=rich_story&doc_id=10304&title=How+touching&categoryid=3&channelid=3, Mar. 13, 2007.

Nashel, Andrew and Razzaoue, Sharif: "Tactile Virtual Buttons for Mobile Devices", http://delivery.acm.org/10.1145/770000/766032/p854-nashel.pdf?key1=766032&key2=9913089911&coll=GUIDE&dl=GUIDE&CFID=48959587&CFTOKEN=14855146 , Apr. 10, 2007.

\* cited by examiner

*Primary Examiner* — Duc Dinh
(74) *Attorney, Agent, or Firm* — John L. Rogitz

(57) ABSTRACT

An input system for a TV remote control or other system has a single touch surface with a deformable haptic assembly below the touch surface such that a user placing a finger on the touch surface can feel deformation of the haptic assembly. A pressure sensing assembly is below the haptic assembly and sensing motion of a finger on the touch surface, with a processor receiving input from the pressure sensing assembly and providing output to the haptic assembly in response. Also, a display receives input sent by the processor in response to input from the pressure sensing assembly to cause the display to present a changing image of a keypad as a user moves a finger on the touch surface.

19 Claims, 4 Drawing Sheets

ONE BUTTON REMOTE CONTROL WITH HAPTIC FEEDBACK

FIELD OF THE INVENTION

The present invention relates generally to one-button computer input devices, and more particularly to one-button remote controls with haptic feedback for TVs and the like.

BACKGROUND OF THE INVENTION

Data input devices such as TV remote controls typically include depressible buttons that users can manipulate to input commands, such as channel up/down, etc. Touch pad-like input devices have been provided in which the buttons do not physically move, but are simply touched by hand to input commands. While these devices provide advantages over mechanical buttons, users may prefer the tactile feedback that mechanical buttons provide. Furthermore, current touch-pad like input devices typically model conventional remote controls with mechanical buttons by providing the same multiplicity of touch keys as are provided on conventional remote controls, which defeats one potential advantage of touch-pad like devices, namely, the ability through software to reduce the number of components that must be incorporated into the device.

SUMMARY OF THE INVENTION

A TV remote control system includes a portable hand-held housing and a wireless transmitter supported by the housing. A processor is supported by the housing and provides signals for wireless transmission by the transmitter. A touch surface on the housing is exposed to a user's touch, with a pressure sensor array supported on the housing below the touch surface providing input signals to the processor in response to pressure from a person's finger on the touch surface. Also, a haptic membrane assembly is disposed between the touch surface and pressure sensor array and is selectively moved by the processor in response to finger pressure on the pad. A display presents an image of a remote control key array based on signals from the processor responsive to finger pressure on the pad. If desired, the image may present more keys than are on the housing. Indeed, in one non-limiting implementation, the touch surface is the only input device on the housing.

The display can be associated with a TV receiving signals from the transmitter. Or, the display can be supported on the housing of the remote control.

One non-limiting membrane assembly includes an array of individually inflatable fluid sacs. Each sac is associated with a respective valve controlled by the processor to inflate and deflate to provide haptic feedback of a finger moving over emulated button boundaries, with the sac actuation thus being in response to finger pressure on the touch surface.

Another non-limiting membrane assembly includes an array of individually movable diaphragms that are moved by electrostatic force or an array of electromagnetic coils.

With more specificity, in response to a non-sliding, rolling motion of a finger on the pad, the processor selectively moves the haptic membrane assembly to propagate a wave across the pad as a haptic model of a finger moving across a boundary of a mechanical data input key. Moreover, the non-limiting display presents indication (such as cursor position) of which key in the image of a remote control key array is modeled as the key currently associated with the touch surface. In this way, the touch surface is associated with a sequence of two or more keys in the image of a remote control key array as a finger moves as by slightly rolling on the touch surface.

In another aspect, a method of data entry includes providing a touch surface on an input device, and sensing changing pressure as a user moves a finger on the touch surface. The method further includes providing haptic feedback through the touch surface of emulated finger motion on a notional keypad in response to the changing pressure. Visual feedback is provided on a display of emulated finger motion on a notional keypad in response to the changing pressure, with the visual feedback being keyed to the haptic feedback.

In yet another aspect, an input system has a touch surface and a deformable haptic assembly below the touch surface and in contact with the touch surface. A user placing a finger on the touch surface can feel deformation of the assembly. A pressure sensing assembly is below the haptic assembly to sense motion of a finger on the touch surface. A processor receives input from the pressure sensing assembly and provides output to the haptic assembly in response, while a display receives input sent by the processor in response to input from the pressure sensing assembly to cause the display to present a changing image of a keypad as a user moves a finger on the touch surface.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
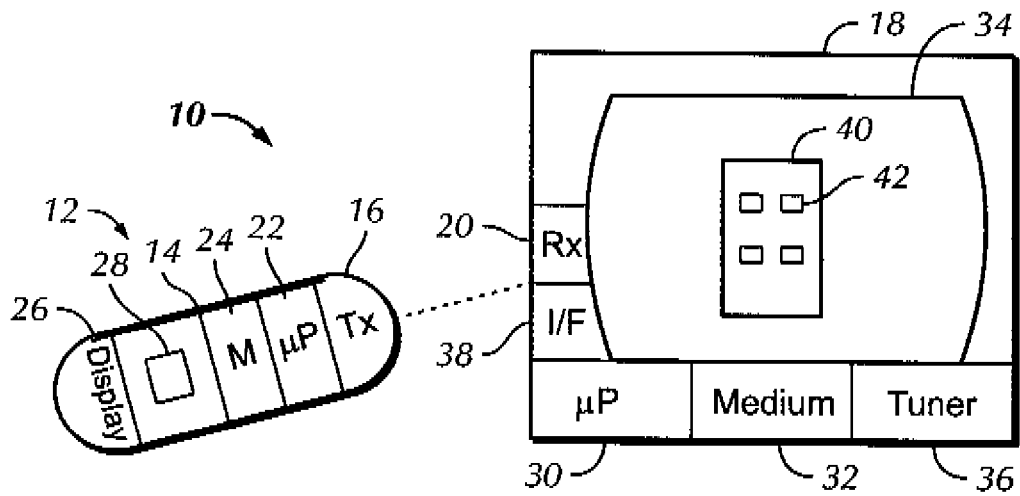
FIG. 1 is a schematic view of a first environment in which present principles may be used, showing a TV remote control with input pad for sending commands to a TV system.

Referring initially to FIG. 1, a system is shown, generally designated 10, that includes a TV remote control 12 with a housing 14 that bears a wireless transmitter 16 such as an infrared or radiofrequency transmitter for transmitting commands such as channel up/down, volume up/down, and the like to a TV system 18 having a wireless receiver 20. The remote control housing 14 also bears a remote processor 22 that can access a tangible computer-readable medium 24 that may store code executable by the processor 22 for undertaking logic disclosed herein. The medium 24 may be, without limitation, solid state memory, disk-based memory, or other appropriate memory, permanently housed in the remote control 12 or removably engaged therewith. The remote control housing 14 can also support a visual display 26 and a touch surface 28 in accordance with present principles. The touch surface may be made of a touch pad material and may be a planar sheet of material that overlays the structure described below. As shown, the touch surface 28 may be a single button-sized input element that operates in accordance with disclosure below to provide cursor and entry input to the processor 22, which can control the display 26 in response.

The TV system 18 may also have a TV processor 30 that can access a TV computer readable medium 32 to control a TV display 34 and a TV tuner 36 in response to signals sent from the receiver 20. The TV processor 30, in addition to or in cooperation with the remote processor 22, can execute logic herein, all or parts of which may be stored on the TV medium 32. In some implementations the TV system 18 may also include a wide area computer network interface 38 for receiving audio-video streams from, e.g., the Internet. It is to be understood that the components of the TV system 18 may be supported in aa TV chassis, or some of the components may be supported in a separately housed set-top box or other receiver that is electrically connected to the TV processor 30.

As shown, the TV display 34 can present an image 40 of a notional keypad with plural keys 42. In addition or alternatively, the image 40 can be presented on the remote display 26. As described further below, while only a single key-like touch surface 28 need be provided on the remote control 12, slight motion of a person's finger on the touch surface 28 as by pressing in a direction of intended cursor motion can result in the image 40 changing (e.g., by moving a screen cursor) to indicate emulated finger motion over plural notional keys 42, and this visual feedback of simulated motion is accompanied by coordinated haptic feedback representing finger motion over discrete mechanical key structure and generated through the touch surface 28 as described further below.

Figure 2:
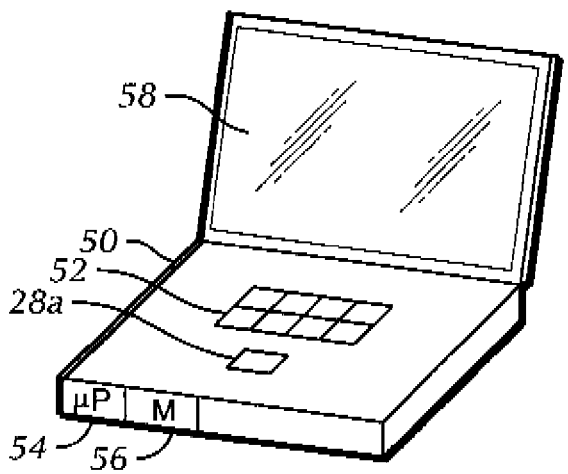
FIG. 2 is a schematic view of a second environment in which present principles may be used, showing an input pad for a computer.

While one embodiment contemplates a TV remote control application as shown in FIG. 1, as shown in FIG. 2 a touch surface 28a in accordance with present principles may be provided on a computer 50 such as a notebook computer with input keyboard 52, processor 54, and computer readable medium 56. The processor 54 can display images on a monitor 58 in accordance with present principles.

Figure 3:
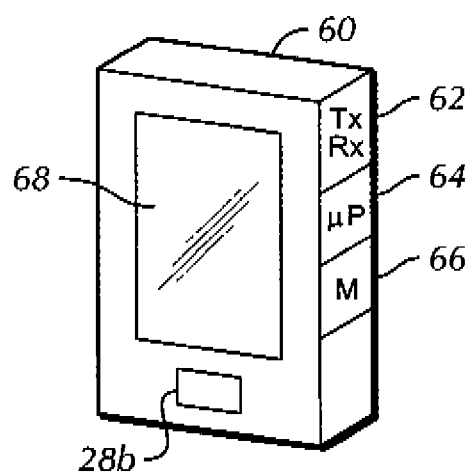
FIG. 3 is a schematic view of a third environment in which present principles may be used, showing an input pad for a wireless telephone.
Figure 4:
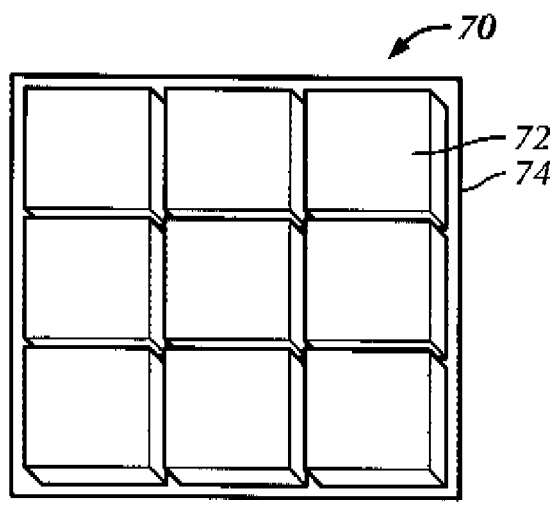
FIG. 4 is a perspective view of a non-limiting pressure sensor array supported on a substrate such as a circuit board in the housing of the remote control shown in FIG. 1.

Furthermore, as shown in FIG. 3 a touch surface 28b in accordance with present principles may be provided on a wireless telephone 60 with wireless telephony transceiver 62, processor 64, and computer readable medium 66. The processor 64 can display images on a display 68 in accordance with present principles.

FIGS. 4-8 show non-limiting details of one embodiment of the touch surface 28 using the embodiment of FIG. 1 as an example, it being understood that the touch surface embodiments of FIGS. 2 and 3 are configured and function similarly. An array 70 of pressure sensors 72 such as, e.g., force sensing resistors (FSR) or other appropriate pressure sensor may be supported on a substrate 74 such as a circuit board in the remote control housing 14. The array 70 lies directly beneath the touch surface 28, with the below-described haptic membrane assembly intervening but still transmitting pressure from the surface of the touch surface 28 to the array 70. While an array of plural sensors 72 is shown, an array of a single sensor that can detect motion in accordance with principles herein may be used.

Figure 5:
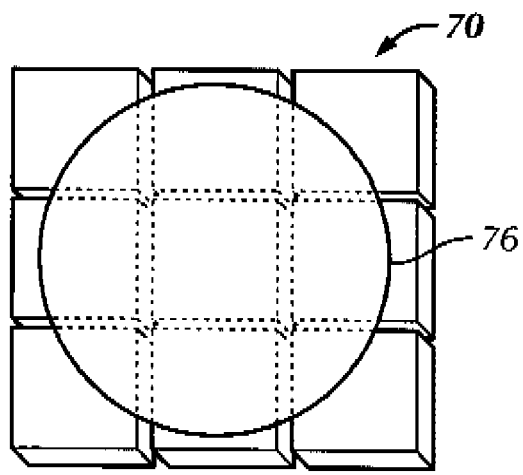
FIG. 5 is a perspective view similar to FIG. 4, schematically showing the area of pressure on the sensor array from a person's finger.
Figure 6:
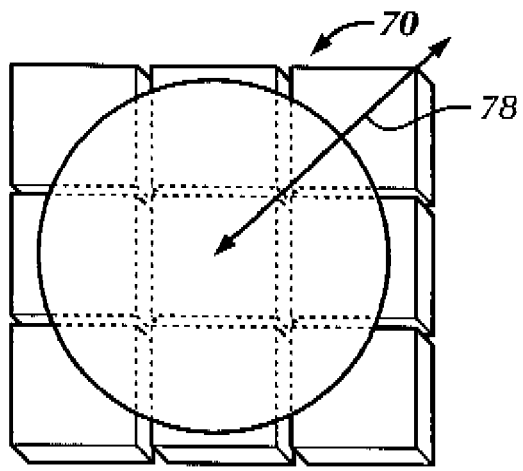
FIG. 6 is a perspective view similar to FIGS. 4 and 5, schematically showing the area of pressure on the sensor array from a person's finger when the person rolls the finger slightly to induce a motion vector.

As shown in FIG. 5, finger pressure, illustrated as a circle 76, may be transmitted through the touch surface 28 to the array 70. When a person moves the finger slightly as by slightly rolling it or, from another point of view, by pressing in an x-y direction on the touch surface without sliding the skin on the touch surface, the varying signals from the sensors 72 are sent to the processor 22, which derives a direction of finger motion represented by a vector 78 as shown in FIG. 6. This can be done relatively simply, e.g., in the example shown in FIG. 6, increasing pressure on the upper right sensor 72 of the array 70 indicates motion to the upper right as indicated by the vector. The magnitude of the vector may be determined based on the rapidity of pressure change in the x-y plane, with faster change indicating greater magnitude, or on magnitude of pressure in the z-dimension, with greater pressure indicating greater vector magnitude. Some combination of these may be used.

Once the vector of finger pressure motion is established, a cursor on the remote display 26 and/or the TV display 34 is caused to move relative to the image 40 of notional keys, in effect causing the image to change. Cursor motion is in the direction of the vector and may proceed at one speed on the display or at a speed that is proportional to the magnitude of the vector. Cursor motion may proceed, for instance, as long as finger pressure is sensed on the touch surface 28. In this way, the user is presented with visual feedback of emulated finger motion on the notional keypad in response to the sensed changing pressure. As intended herein, the visual feedback is keyed to haptic feedback.

Figure 7:
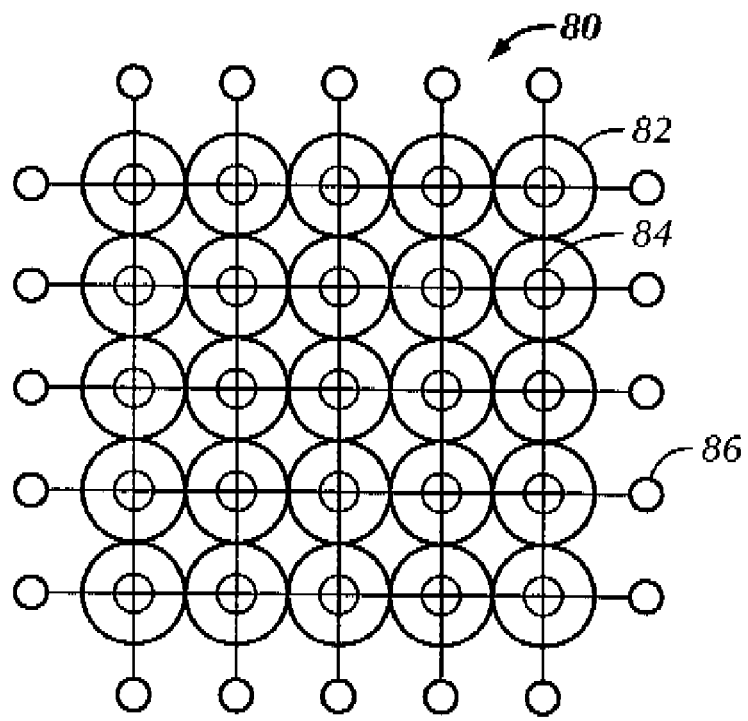
FIG. 7 is a schematic plan view of one non-limiting implementation of the haptic membrane as established by plural inflatable fluid sacs in an array that is disposed on top of the pressure array shown in FIGS. 4-6.
Figure 8:
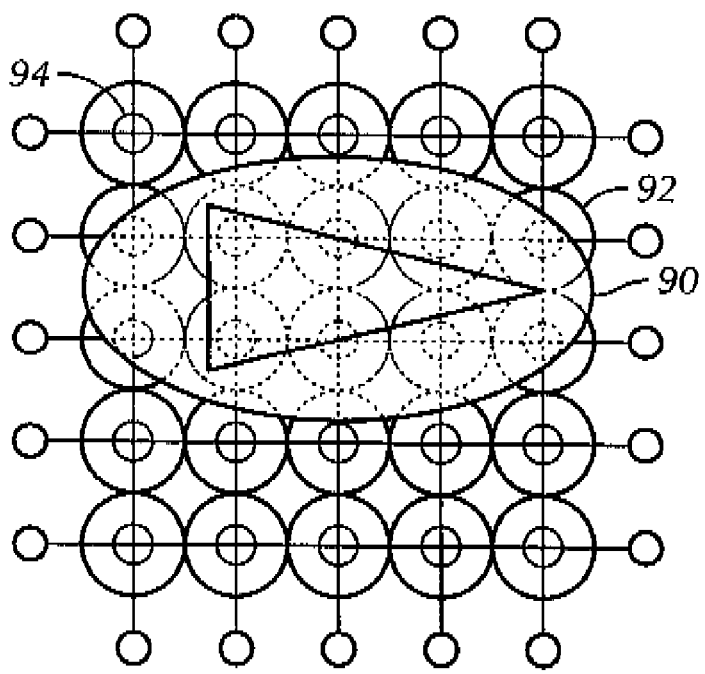
FIG. 8 is a schematic plan view similar to FIG. 7 illustrating how a non-round button shape can be modeled by the haptic membrane.

Accordingly and turning now to FIGS. 7 and 8 to understand how haptic feedback of cursor motion is generated, a haptic membrane assembly 80 is disposed directly under the touch surface 28 between the pressure sensors and touch surface. The assembly 80 can be inflatable and can be selectively inflated by the processor 22 in response to finger pressure on the touch surface as described in the following paragraphs.

As shown in FIG. 7, the membrane assembly 80 includes an array of individually inflatable fluid sacs 82. The sacs 82 may be inflated with air or other gas or with a liquid. Each sac 82 is associated with a respective electro-mechanical valve 84 the electrical portion of which is electrically connected to the processor 82 by preferably two crossing electrodes in a control matrix 86, such that each valve 84 is individually addressable to open or close to inflate and deflate its respective sac 82. To this end, a small fluid pump and/or source of vacuum may be in fluid communication with the valves 84.

As illustrated in FIG. 8, in response to, for instance, non-sliding, rolling motion of a finger on the touch surface 29, the processor 22 moves the screen cursor and furthermore in coordination therewith selectively inflates the sacs 82 of the haptic membrane assembly 80 to propagate waves across the assembly that are transmitted to the touch surface 28 as a haptic model of a finger moving across a boundary of a simulated mechanical data input key 90. That is, some sacs 92 are inflated and other sacs 94 are not as required to establish a raised periphery of the key 90, in the case shown, an oval "enter" key, an image of which simultaneously would be presented on the display 26/34. As pressure signals indicate that the cursor moves, the sacs 82 are inflated and deflated as necessary to cause the periphery of the key 90 to move across the touch surface 28 in a direction opposite to cursor motion to emulate what the user were to feel were he sliding his finger past a discrete key on a multi-key input device.

Once the user has by means of stationary finger motion stopped cursor motion to position the cursor over a desired key on the image 40, he can exert greater pressure or tap the touch surface or input some other predefined tactile signal to indicate clicking the key. In response, the sacs 82 may be deflated accordingly to simulate a mechanical key moving downward when a user presses it.

Thus, by selecting an appropriate sac 82 granularity the surface of the touch surface 28 can be made to change to emulate the shape of a button, for instance, as if a finger were moving across the flat to over the button. The skilled artisan may now recognize, however, that the finger actually is stationary (apart from the minor rolling motion) and the "button shape" moves like a wave across the array 80 analogous to the location of the cursor as it moves across the display.

This allows users to essentially glide a digit across a button panel without actually moving the digit as the "panel is seemingly moving under the digit".

Figure 9:
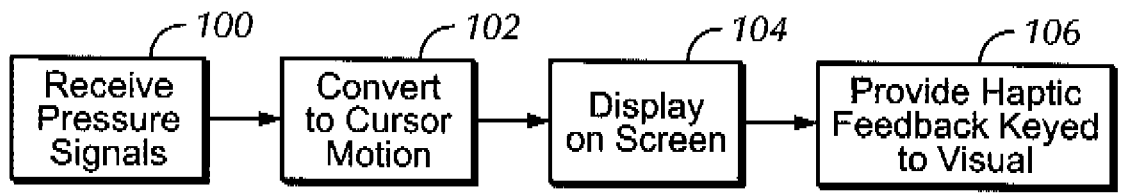
FIG. 9 is a flow chart of general non-limiting logic that may be used.

Now referring to FIG. 9, commencing at block 100 signals representing finger pressure from a finger on the touch surface 28 are received from the pressure sensor array 70. The finger pressure on the touch surface 28, in other words, propagates through the haptic membrane assembly 80 to the pressure sensor array 70. At block 102 these signals are converted to cursor motion as described above, and at block 104 the cursor and image 40 of notional keys are displayed on one or both of the remote display 26 and TV display 34. Keyed to the visual feedback provided by the display at block 104 is the generation of haptic feedback at block 106 as described.

Figure 10:
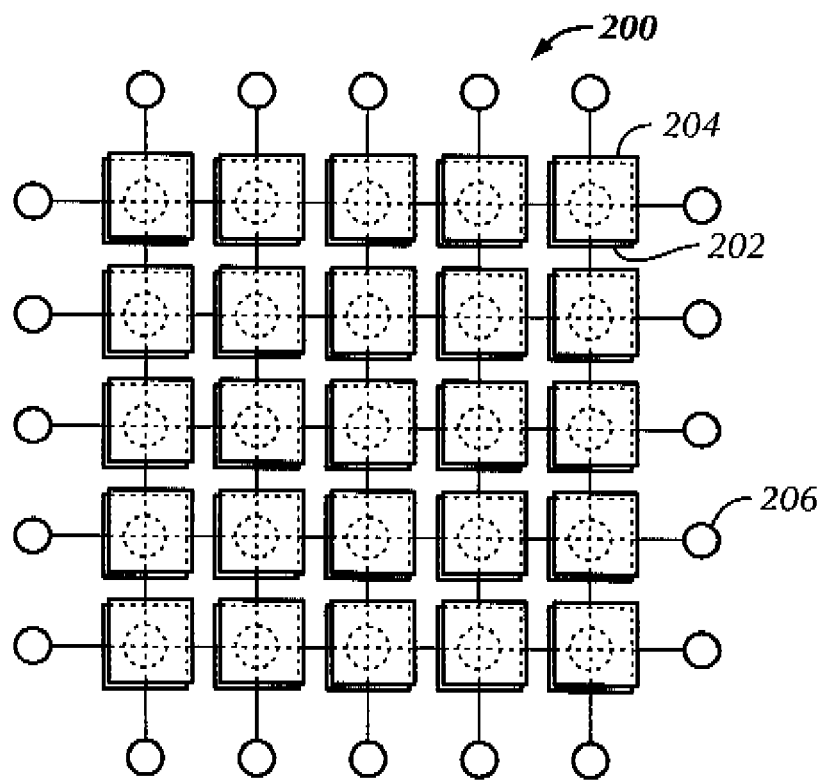
FIG. 10 is a schematic plan view of another non-limiting implementation of the haptic membrane as established by plural electrostatic diaphragms in an array that is disposed on top of the pressure array shown in FIGS. 4-6.

FIG. 10 shows another haptic membrane assembly 200 that uses an array of individually movable elements 202 that are electrostatically or magnetically movable relative to respective stationary elements 204. In one implementation the movable elements 202 are diaphragms that are moved by electrostatic repulsion and attraction, in lieu of the inflatable sacs described above. Each diaphragm is disposed between the touch surface and a respective stationary element 204 that may be embodied as an electrostatic substrate. The diaphragms are individually biased toward and away from (i.e., attracted to and repulsed from) their respective substrates by selectively energizing and deenergizing electrodes 206 in a control matrix to electrostatically move the diaphragms. In one implementation, the diaphragms are permanently charged and the electrodes 206 selectively energize the substrates. In another implementation, the substrates are permanently charged and the electrodes 206 selectively energize the diaphragms.

The diaphragms and substrates may be square-shaped and formed complementarily to each other as shown, or they may assume other shapes and they need not be shaped complementarily to each other. In an alternate embodiment the substrates are not stationary and both the diaphragms and substrates may be individually charged to obtain a stronger repulsion field (and, hence, stronger haptic feedback) by charging each side with the same potential.

In another implementation, the movable elements 202 are addressable electromagnetic coils and the stationary elements 204 are permanent magnets in a film.

While the particular ONE BUTTON REMOTE CONTROL WITH HAPTIC FEEDBACK is herein shown and described in detail, it is to be understood that the subject matter which is encompassed by the present invention is limited only by the claims.

What is claimed is:

1. A TV remote control system, comprising:
   a portable hand-held housing;
   a wireless transmitter supported by the housing;
   a processor supported by the housing and providing signals for wireless transmission by the transmitter;
   a touch surface on the housing and exposed to a user's touch;
   a pressure sensor array supported on the housing below the touch surface and providing input signals to the processor in response to pressure from a person's finger on the touch surface;
   a haptic membrane assembly between the touch surface and pressure sensor array and being selectively moved by the processor at least partially in response to finger pressure on the touch surface; and
   a display presenting an image of a remote control key array based on signals from the processor responsive to finger pressure on the pad, wherein the processor determines a vector of finger motion using signals from the array, the vector having a direction and a magnitude, a cursor on a display being caused to move in the direction of the vector at a speed that is proportional to the magnitude of the vector.

2. The system of claim 1, wherein the touch surface is the only input device on the housing.

3. The system of claim 1, wherein the display is associated with a TV receiving signals from the transmitter.

4. The system of claim 1, wherein the display is supported on the housing.

5. The system of claim 1, wherein the membrane assembly includes an array of individually inflatable fluid sacs.

6. The system of claim 5, wherein each sac is associated with a respective valve controlled by the processor to haptically model finger movement on a keyboard derived from finger pressure on the touch surface.

7. The system of claim 1, wherein in response to at least one non-sliding motion of a finger on the pad, the processor selectively moves the haptic membrane assembly to propagate at least one wave across the touch surface as a haptic model of a finger moving across a boundary of a mechanical data input key.

8. The system of claim 7, wherein the display presents indication of which key in the image of a remote control key array is modeled as the key currently associated with the touch surface, whereby the touch surface is associated with a sequence of at least two keys in the image of a remote control key array as a finger moves on the touch surface.

9. The system of claim 1, wherein the membrane assembly includes an array of individually electrostatically chargeable diaphragms.

10. The system of claim 1, wherein the membrane assembly includes an array of individually energizable coils.

11. A method of data entry comprising:
    providing a touch surface on an input device;
    sensing changing pressure as a user moves a finger on the touch surface;
    providing haptic feedback through the touch surface of emulated finger motion on a notional keypad in response to the changing pressure; and
    providing visual feedback on a display of emulated finger motion on a notional keypad in response to the changing pressure, the visual feedback being keyed to the haptic feedback, wherein the providing haptic feedback includes:
    in response to non-sliding rolling motion of a finger on the touch surface moving a cursor on the display and furthermore in coordination therewith propagating a wave across the touch surface as a haptic model of a finger moving across a boundary of a simulated mechanical data input key such that a periphery of the simulated mechanical data input key moves across the touch surface in a direction opposite to cursor motion to emulate tactile feedback of sliding a finger past a discrete key on a multi-key input device.

12. The method of claim 11, comprising:

in response to the changing pressure, deforming at least one membrane assembly under the touch surface to provide the haptic feedback to a person of moving a finger from one mechanically depressible key to another mechanically depressible key on a notional keypad.

13. The method of claim 11, wherein the input device is a TV remote control.

14. The method of claim 11, wherein the input device is associated with a wireless telephone or with a computer.

15. The method of claim 11, wherein a pressure sensor array is supported below the touch surface and provides input signals to a processor in response to pressure from a person's finger on the touch surface.

16. The method of claim 15, wherein the membrane assembly is between the touch surface and pressure sensor array and is selectively moved by the processor to haptically model finger movement on a keyboard derived from finger pressure on the touch surface.

17. The method of claim 11, wherein the display is a TV display.

18. The method of claim 11, wherein the display is on the TV remote control.

19. The method of claim 11, wherein the membrane assembly includes an array of individually inflatable fluid sacs or individually electrostatically chargeable diaphragms or energizable coils.

* * * * *